United States Patent
Yang et al.

(10) Patent No.: US 11,286,913 B2
(45) Date of Patent: Mar. 29, 2022

(54) METHOD AND APPARATUS FOR MONITORING FORMATION OF ICE ON WIND TURBINE BLADE

(71) Applicant: BEIJING GOLDWIND SCIENCE & CREATION WINDPOWER EQUIPMENT CO., LTD., Beijing (CN)

(72) Inventors: Boyu Yang, Beijing (CN); Baifang Wang, Beijing (CN); Qingyang Cheng, Beijing (CN)

(73) Assignee: BEIJING GOLDWIND SCIENCE & CREATION WINDPOWER EQUIPMENT CO., LTD., Beijing (CN)

( * ) Notice: Subject to any disclaimer, the term of this patent is extended or adjusted under 35 U.S.C. 154(b) by 730 days.

(21) Appl. No.: 16/082,433

(22) PCT Filed: Nov. 23, 2017

(86) PCT No.: PCT/CN2017/112477
§ 371 (c)(1),
(2) Date: Sep. 5, 2018

(87) PCT Pub. No.: WO2019/000818
PCT Pub. Date: Jan. 3, 2019

(65) Prior Publication Data
US 2021/0180571 A1    Jun. 17, 2021

(30) Foreign Application Priority Data
Jun. 26, 2017  (CN) .......................... 201710494706.1

(51) Int. Cl.
*F03D 80/40* (2016.01)
*F03D 17/00* (2016.01)
(Continued)

(52) U.S. Cl.
CPC ............. *F03D 80/40* (2016.05); *F03D 17/00* (2016.05); *G06K 9/46* (2013.01); *G06K 9/6228* (2013.01);
(Continued)

(58) Field of Classification Search
CPC ......... F03D 80/40; F03D 17/00; G06T 7/194; G06T 7/13; G06K 9/46; G06K 9/6228; G06K 9/6256; G06N 3/04; G06N 3/08
See application file for complete search history.

(56) References Cited

U.S. PATENT DOCUMENTS

2008/0152493 A1    6/2008   Sundermann et al.
2009/0318825 A1*  12/2009   Kilborn ................ A61B 5/4088
                                                                600/544
(Continued)

FOREIGN PATENT DOCUMENTS

CN    101886617 A       11/2010
CN    103982378 A  *    8/2014    ........... G06T 7/0004
(Continued)

OTHER PUBLICATIONS

"Holistically-Nested Edge Detection", Xie et al. 2015 IEEE International Conference on Computer Vision, 2015.*
(Continued)

*Primary Examiner* — Qun Shen

(57) ABSTRACT

A method and apparatus for monitoring formation of ice on a wind turbine blade are provided. The method includes: capturing an image of the blade through a camera; detecting a region of the blade from the captured image; clearing image information of a background region from the captured image, which is in the captured image except for the region of the blade, to obtain a blade image; and inputting the obtained blade image into a recognition model of ice on a blade obtained by training on a sample set, to determine
(Continued)

whether ice is on the captured blade, wherein the sample set comprises a plurality of blade images indicating that ice is on blades.

17 Claims, 7 Drawing Sheets

(51) Int. Cl.
| | |
|---|---|
| *G06T 7/194* | (2017.01) |
| *G06T 7/13* | (2017.01) |
| *G06K 9/46* | (2006.01) |
| *G06K 9/62* | (2006.01) |
| *G06N 3/04* | (2006.01) |
| *G06N 3/08* | (2006.01) |

(52) U.S. Cl.
CPC ............ *G06K 9/6256* (2013.01); *G06N 3/04* (2013.01); *G06N 3/08* (2013.01); *G06T 7/13* (2017.01); *G06T 7/194* (2017.01); *F05B 2270/8041* (2013.01); *G06T 2207/20081* (2013.01); *G06T 2207/20084* (2013.01); *G06T 2207/30184* (2013.01); *G06T 2207/30192* (2013.01)

(56) References Cited

U.S. PATENT DOCUMENTS

| | | | | |
|---|---|---|---|---|
| 2010/0111695 | A1* | 5/2010 | Klausmann | ............ F03D 80/40 416/39 |
| 2012/0169053 | A1* | 7/2012 | Tchoryk, Jr. | ............ G01P 5/26 290/44 |
| 2013/0307961 | A1 | 11/2013 | Puigcorbe | |
| 2016/0222946 | A1* | 8/2016 | Krings | ............... G01M 5/0066 |
| 2017/0173262 | A1* | 6/2017 | Veltz | .................... A61B 5/0022 |
| 2018/0171985 | A1* | 6/2018 | Grunnet | ................ F03D 1/0675 |
| 2019/0370999 | A1* | 12/2019 | Liu | ........................ F03D 17/00 |

FOREIGN PATENT DOCUMENTS

| | | | | |
|---|---|---|---|---|
| CN | 103982378 | A | 8/2014 | |
| CN | 104865269 | A | 8/2015 | |
| CN | 104915676 | A | 9/2015 | |
| CN | 105298761 | A | 2/2016 | |
| CN | 106677985 | A | 5/2017 | |
| CN | 106683091 | A | 5/2017 | |
| CN | 106762451 | A | 5/2017 | |
| CN | 106875381 | * | 6/2017 | .......... G06T 7/0004 |
| CN | 106875381 | A | 6/2017 | |
| CN | 107154037 | A | 9/2017 | |
| EP | 2 481 924 | A1 | 8/2012 | |
| WO | 2012104276 | A1 | 8/2012 | |
| WO | 2016/033181 | A1 | 3/2016 | |
| WO | 2016/124103 | A1 | 8/2016 | |

OTHER PUBLICATIONS

Extended European Search Report dated Aug. 28, 2019; Appln. No. 17899223.6.

The International Search Report dated Mar. 23, 2018; PCT/CN2017/112477.

The First Chinese Office Action dated Mar. 27, 2020; Appln. No. 201710494706.1.

* cited by examiner

| ConvNet Configuration (convolution neural network configuration) | | | | | |
|---|---|---|---|---|---|
| A | A-LRN | B | C | D | E |
| 11 weight layers (weight layers) | 11 weight layers | 13 weight layers | 16 weight layers | 16 weight layers | 19 weight layers |
| input (input layer) (224×224 RGB image (image)) | | | | | |
| conv3-64 | conv3-64<br>LRN (partial response normalization layer) | conv3-64<br>conv3-64 | conv3-64<br>conv3-64 | conv3-64<br>conv3-64 | conv3-64<br>conv3-64 |
| maxpool (maximum pooling layer) | | | | | |
| conv3-128 | conv3-128 | conv3-128<br>conv3-128 | conv3-128<br>conv3-128 | conv3-128<br>conv3-128 | conv3-128<br>conv3-128 |
| maxpool | | | | | |
| conv3-256<br>conv3-256 | conv3-256<br>conv3-256 | conv3-256<br>conv3-256 | conv3-256<br>conv3-256<br>conv1-256 | conv3-256<br>conv3-256<br>conv3-256 | conv3-256<br>conv3-256<br>conv3-256<br>conv3-256 |
| maxpool | | | | | |
| conv3-512<br>conv3-512 | conv3-512<br>conv3-512 | conv3-512<br>conv3-512 | conv3-512<br>conv3-512<br>conv1-512 | conv3-512<br>conv3-512<br>conv3-512 | conv3-512<br>conv3-512<br>conv3-512<br>conv3-512 |
| maxpool | | | | | |
| conv3-512<br>conv3-512 | conv3-512<br>conv3-512 | conv3-512<br>conv3-512 | conv3-512<br>conv3-512<br>conv1-512 | conv3-512<br>conv3-512<br>conv3-512 | conv3-512<br>conv3-512<br>conv3-512<br>conv3-512 |
| maxpool | | | | | |
| FC (full connection layer)-4096 | | | | | |
| FC-4096 | | | | | |
| FC-1000 | | | | | |
| soft-max (classification function) | | | | | |

Figure 8

METHOD AND APPARATUS FOR MONITORING FORMATION OF ICE ON WIND TURBINE BLADE

CROSS REFERENCE TO RELATED APPLICATIONS

The present disclosure is a national phase of International Application No. PCT/CN2017/112477 which claims the priority to Chinese Patent Application No. 201710494706.1, filed on Jun. 26, 2017 with the State intellectual Property Office of People's Republic of China, the content of which are all incorporated herein by reference.

FIELD

The present disclosure generally relates to a technical field of wind power, and in particular to a method and an apparatus for monitoring formation of ice on a wind turbine blade.

BACKGROUND

Wind resources of plateau regions, cold regions, ridges and mountaintops are very rich and have great development value. Due to different energy demands and uneven distribution of wind resources, high-quality wind resources of China are generally distributed in three north regions (northeast, northwest, north China) and plateau regions, and these regions have low temperature and high humidity in winter, so it is easy to cause formation of ice on the wind turbine blades. In addition, there is also ice on blade phenomenon in some wind farms in southern regions. The ice on the blade may cause a change in aerodynamic performance of the wind turbine blades, resulting in blade overload and uneven distribution of blade load, thus reducing the wind capturing capacity and affecting power generation. In addition, ice on the blade is easy to cause overload and thus shortens service life of components, and during rotation of the blades, ices are easy to fall off when ice adhesion is decreased, thus causing an operation accident.

The formation of ice on the blade is a process that water vapor congeals on a blade surface to form water droplets and the water droplets are congealed to ice crystal on the blade surface due to a temperature lower than a freezing point. When the ice is on the blade, influences on the wind turbine are as follows: decrease of a lift coefficient which results in reduction of Cp and loss of power generation; increase of drag coefficient which results in a great axial load of a transmission chain and thus may cause an acceleration of a cabin exceeding a limitation; increase of blade weight and increase of hub torque which affect fatigue life of the blade root; impeller pneumatic and mass unbalance; and inaccurate control of blade pitch change by a control system of the wind turbine at a rated speed.

Nowadays, ice on the blades of the wind turbine becomes an important factor that hinders the development of the wind energy and an uncertainty factors of a wind farm construction, thereby greatly reducing utilization of the wind turbine and seriously threatening safe operation of the wind turbine, as well as potential hazards of on-site personnel, therefore, it is of great practical significance on how to accurately recognize ice on the blades of the wind turbine.

Currently, the methods for detecting ice on the blade mainly include: detection based on unmatched wind powers, detection using ice sensors, or detection by deploying optical fiber sensors on the blades. However, there are many origins for the unmatched wind powers, and it is difficult to accurately determine whether the unmatched wind powers are caused by ice on the blade. An ice sensor is an indirect measurement method, it only can determine whether ice is on the blade, and cannot determine whether the ice on the blade disappears. In a case where the ice sensor is used for detection, it is easy to cause a long downtime in winter, and it is unable to determine when the wind turbine resumes operation, thereby resulting in economic losses. An optical fiber sensor has relatively high cost, and is difficult to be installed. It requires professional technicians to install the optical fiber sensor, and it is difficult to deploy in the existing wind farm.

SUMMARY

An exemplary embodiment of the present disclosure is to provide a method and an apparatus for monitoring formation of ice on a wind turbine blade so as to solve problems of conventional methods for monitoring formation of ice on a wind turbine blade.

A method for monitoring formation of ice on a wind turbine blade is provided according to an exemplary embodiment of the present disclosure, which includes: capturing an image of the blade through a camera; detecting a region of the blade from the captured image; clearing image information of a background region from the captured image, which is in the captured image except for the region of the blade, to obtain a blade image; and inputting the obtained blade image into a recognition model of ice on a blade obtained by training on a sample set, to determine whether ice is on the captured blade, where the sample set comprises a plurality of blade images indicating that ice is on blades.

An apparatus for monitoring formation of ice on a wind turbine blade is provided according to another exemplary embodiment of the present disclosure, which includes: a capturing unit, configured to capture an image of the blade through a camera; a detection unit, configured to detect a region of the blade from the captured image; a background clearing unit, configured to clear image information of a background region from the captured image, which is in the captured image except for the region of the blade, to obtain a blade image; and a recognition unit, configured to input the obtained blade image into a recognition model of ice on a blade obtained by training on a sample set, to determine whether ice is on the captured blade, wherein the sample set comprises a plurality of blade images indicating that ice is on blades.

A computer readable storage medium storing a computer program is further provided according to another exemplary embodiment of the present disclosure. When the computer program is executed, the above method for monitoring formation of ice on a wind turbine blade is implemented.

A computer is provided according to another exemplary embodiment of the present disclosure, which includes: a readable storage medium storing a computer program. When the computer program is executed by the computer, the above method for monitoring formation of ice on a wind turbine blade is implemented.

The method and apparatus for monitoring formation of ice on a wind turbine blade provided according to the exemplary embodiments of the present disclosure can quickly and accurately monitor whether ice is on the blade of the wind turbine. In addition, the method and apparatus can be applied in a wide range of regions without designing for different wind farms.

Other aspects and/or advantages of the overall design concept of the present disclosure will be described below. Another part of the invention will be clear through the description or may be obtained by implementing the general concept of the present disclosure.

BRIEF DESCRIPTION OF THE DRAWINGS

The above and other purposes and features of exemplary embodiments of the present disclosure will be clearer by the following description in conjunction with the attached drawings of embodiments, wherein:

FIG. 8 is an example of a configuration manner of a recognition model of ice on a blade according to an exemplary embodiment of the present disclosure.

DETAILED DESCRIPTION

Figure 1:
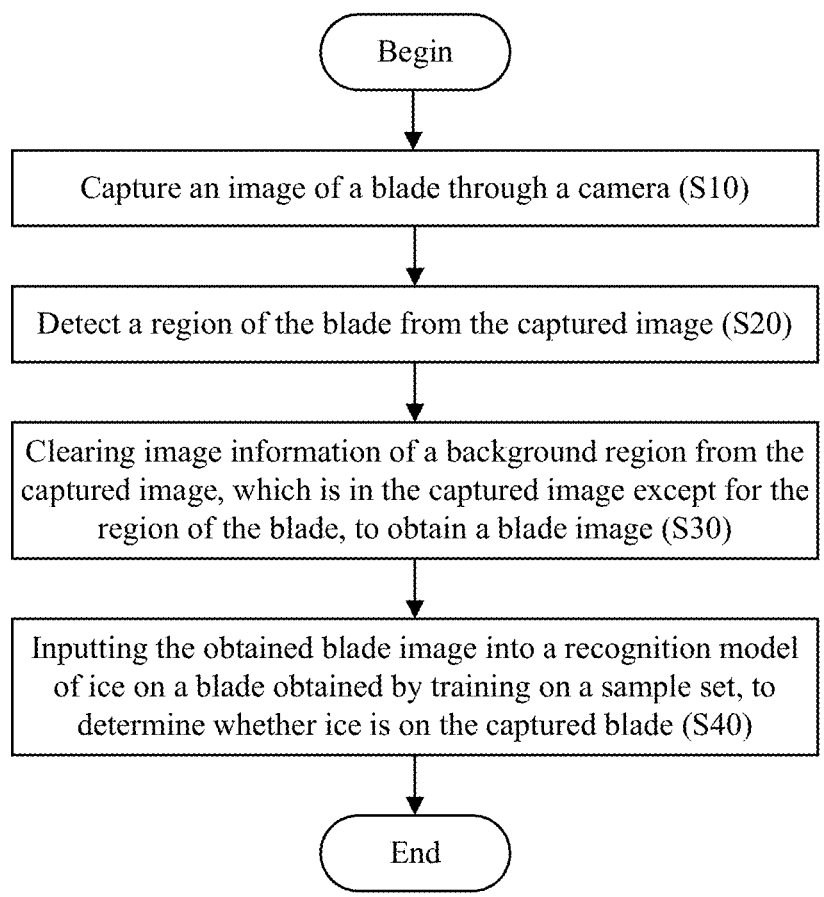
FIG. 1 is a flow chart of a method for monitoring formation of ice on a wind turbine blade according to an exemplary embodiment of the present disclosure.

Reference is made to the embodiment of the present disclosure in detail, and examples of the embodiments are shown in the drawings, where the same label represents the same element. The embodiments are illustrated by referring to the drawings so as to explain the disclosure.

FIG. 1 a flow chart of a method for monitoring formation of ice on a wind turbine blade according to an exemplary embodiment of the present disclosure.

Reference is made to FIG. 1, in step S10, An image of a blade is captured through a camera.

As an example, the image of the blade may be periodically captured through the camera.

As an example, the camera may be arranged on a cabin of the wind turbine. As another example, the camera may capture a clear image in a case of low brightness (such as night) through an infrared fill flash.

In step S20, a region of the blade is detected from the captured image.

The region of the blade may be detected from the captured image in various appropriate manners. As an example, an edge detection may be used to recognize a blade profile from the captured image, so as to determine the region in the profile as the region of the blade. As another example, a significant object detection may be used to detect the region of the blade from the captured image.

As another example, both the edge detection and the significant object detection may be used to detect the region of the blade from the captured image. For example, the edge detection may firstly be used to detect the region of the blade, and the significant object detection is then used to finally determine the region of the blade based on a detection result of the edge detection. For example, the significant object detection may firstly be used to detect the region of the blade, and the edge detection is then used to finally determine the region of the blade based on a detection result of the significant object detection. In addition, the edge detection and the significant object detection may be respectively used to detect the region of the blade, and the detection results are combined to finally determine the region of the blade. For example, the region of the blade is finally determined by using a probabilistic density analysis based on the detection results. Through the above methods, the region of the blade can be detected accurately.

As an example, a training set for the above significant object detection may include at least one of the following types of images: blade images captured at different geographic locations, blade images captured at different time periods, and blade images captured under different weather conditions. Therefore, the fully trained significant object detection model can be used to accurately recognize the region of the blade from a blade image captured under various environments and geographic locations.

It should be understood that before detecting the region of the blade from the captured image, an appropriate image pre-process (such as graying) may be performed on the captured image.

In step S30, image information of a background region, which is a region in the captured image except for the region of the blade, is cleared from the captured image, to obtain a blade image.

Specifically, only image information of the region of the blade (i.e., the region in the blade profile) is reserved in the captured image, and the image information of the region except for the region of the blade (i.e., the background region) is cleared (for example, RGB values are modified to be (0,0,0) to obtain the blade image.

Figure 2:
FIGS. 2 to 4 are examples of background noises in a captured image of the blade according to exemplary embodiments of the present disclosure.
Figure 3:
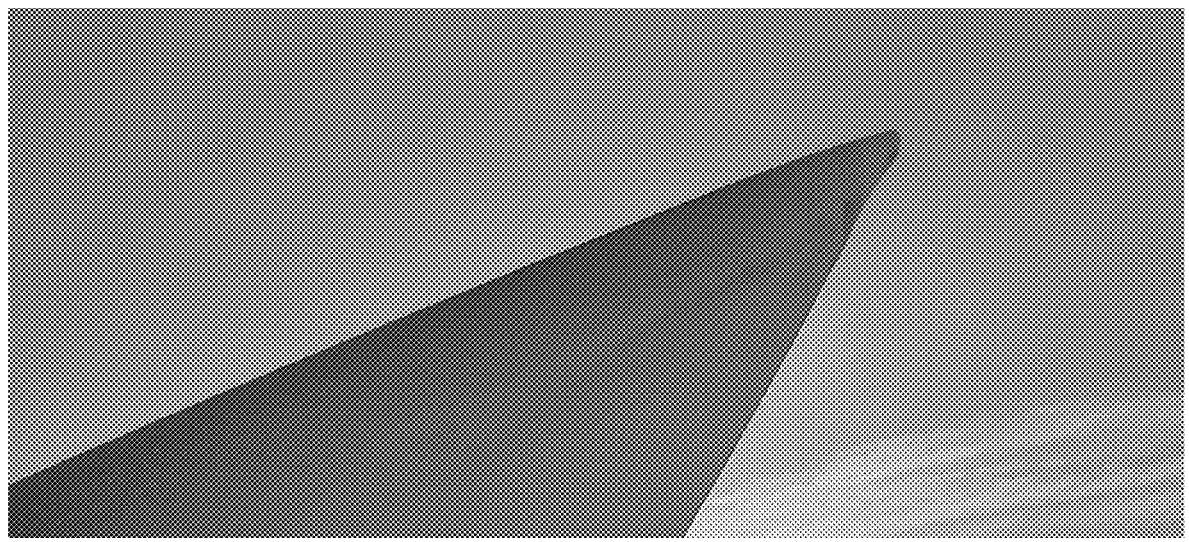
Figure 4:
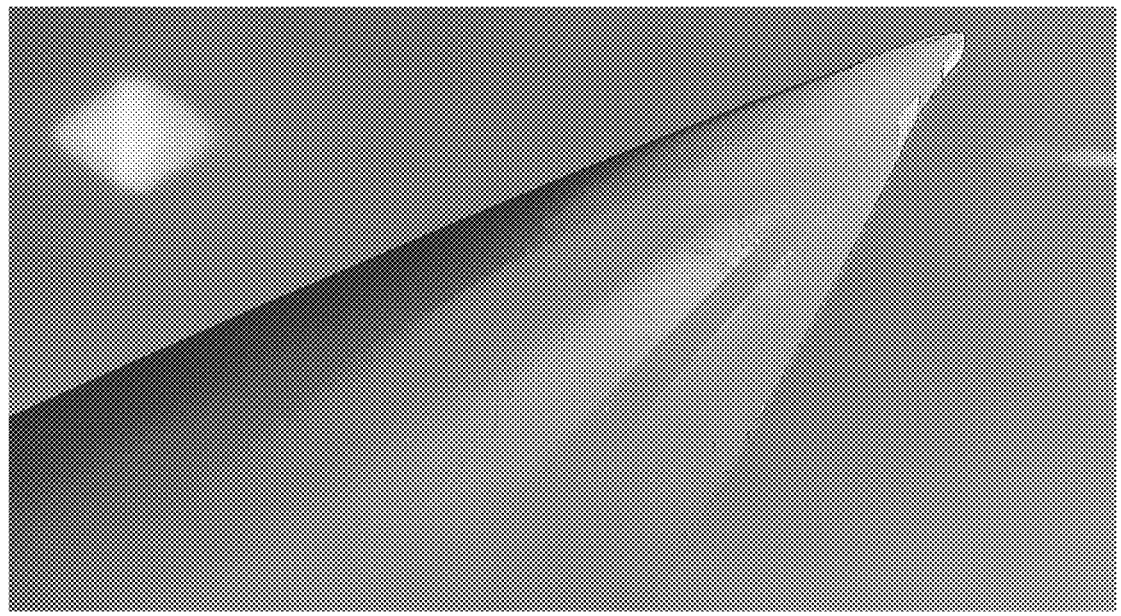

Considering that the environment where the wind turbine is located varies frequently, the background noises (such as the sun shown in FIG. 2, clouds in the sky shown in FIG. 3, light spots in the sky shown in FIG. 4) may have certain similar characteristics as ice on the blade. Therefore, it is required to extract the blade from the overall background, to remove the background noises without loss of information amount of the blade image, thereby preventing the recognition model of ice on a blade from being affected by the background noises.

Figure 5:
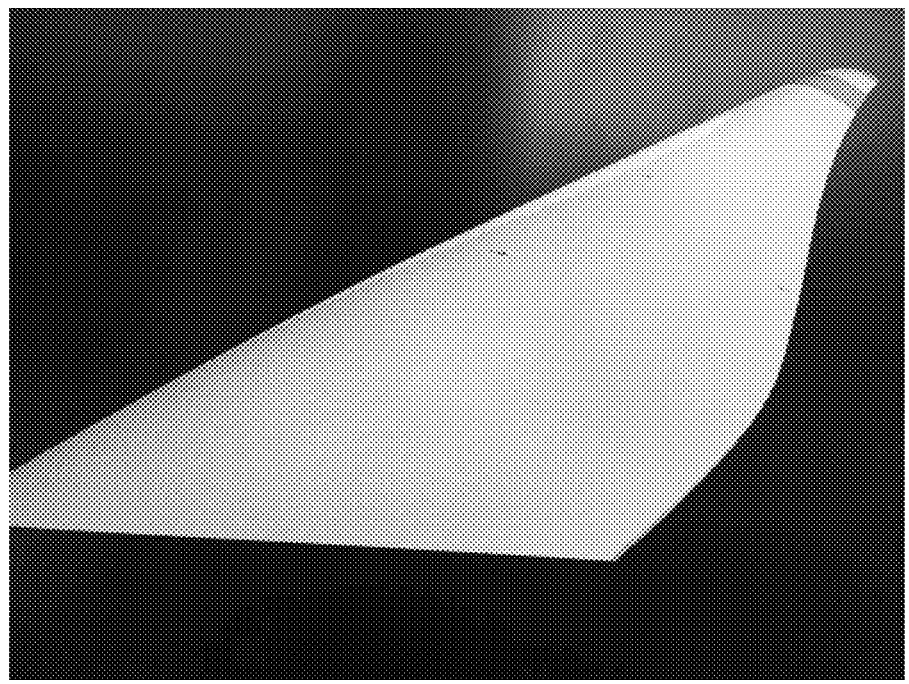
FIG. 5 is an example of a blade image according to an exemplary embodiment of the present disclosure.

FIG. 5 is an example of a blade image according to an exemplary embodiment of the present disclosure. The edge detection may be used to recognize the blade profile from the captured image, and the background information outside the profile is cleared (i.e., the region outside the profile is set to black) with only effective image information in the profile being reserved, to obtain the blade image as shown in FIG. 5.

In step S40, the obtained blade image is inputted into a recognition model of ice on a blade obtained by training on a sample set, to determine whether ice is on the captured blade, where the sample set comprises multiple blade images indicating that ice is on blades.

Considering features of ice on the blade, features of the blade image and features of a convolutional neural network (CNNs), the recognition model of ice on a blade may be obtained by training on the sample set using a convolutional neural network, as an example.

As an example, the sample set may include at least one of the following types of blade images: blade images indicating that ice is on blades and captured at different geographic locations, blade images indicating that ice is on blades and captured at different time periods, and blade images indicating that ice is on blades and captured under different weather conditions.

Here, it should be understood that the blade images indicating that ice is on blades and captured at different geographic locations are blade images obtained after performing step S20 and step S30 on images with iced up blades captured at different geographic locations. The blade images indicating that ice is on blades and captured at different time periods are blade image obtained after performing step S20 and step S30 on images with iced up blades captured at different time periods. The blade images indicating that ice is on blades and captured under different weather conditions are blade image obtained after performing step S20 and step S30 on images with iced up blades captured under different weather conditions.

Considering variability of environment where the wind turbine is located, characters of ice on the blade is different under different environments (for example, due to different lights in the morning and evening, a portion with ice of the blade presents different brightness at different times and presents different contrasts from the portion without ice at different times; for example, due to different locations where the wind turbine is located, the position, area and shape of ice on the blade are different). The above diversified sample set is used to train the recognition model of ice on a blade, and in this case, the method for monitoring formation of the ice on the blade of the wind turbine provided according to the exemplary embodiment of the present disclosure can be applied to a wide range of regions without being limited to the above conditions (i.e., the recognition model of ice on a blade provided according to the present disclosure may be used to perform ice recognition on the blade of the wind turbine located in a wide range of regions), thereby the method can be applied to most wind farms to perform accurate recognition without a need of design for different wind farms.

It is easy to misjudge whether ice is on the blade through a recognition on only a single image considering poor image acquisition environment, therefore a series of images captured during a time period may be recognized, and it is finally determined whether ice is on the blade based on the multiple recognition results, thus improving the recognition accuracy.

As an example, the method for monitoring formation of ice on a wind turbine blade provided according to the exemplary embodiment of the present disclosure may further include: determining whether ice is on the captured blade based on a recognition result corresponding to each image of multiple images of the blade captured during a predetermined time period, where the recognition result corresponding to the each image is obtained by performing step 10 to step 40 on the each image sequentially.

As an example, it may be determined, from the multiple images, a first quantity of images of which the recognition result indicates that ice is on the blade and a second quantity of images of which the recognition result indicates that ice is not on the blade. It is determined that ice is on the captured blade if the first quantity is greater than the second quantity, and it is determined that ice is not on the captured blade if the second quantity is greater than the first quantity.

Figure 6:
FIGS. 6 and 7 are examples of a recognition result of ice on a blade according to exemplary embodiments of the present disclosure.
Figure 7:
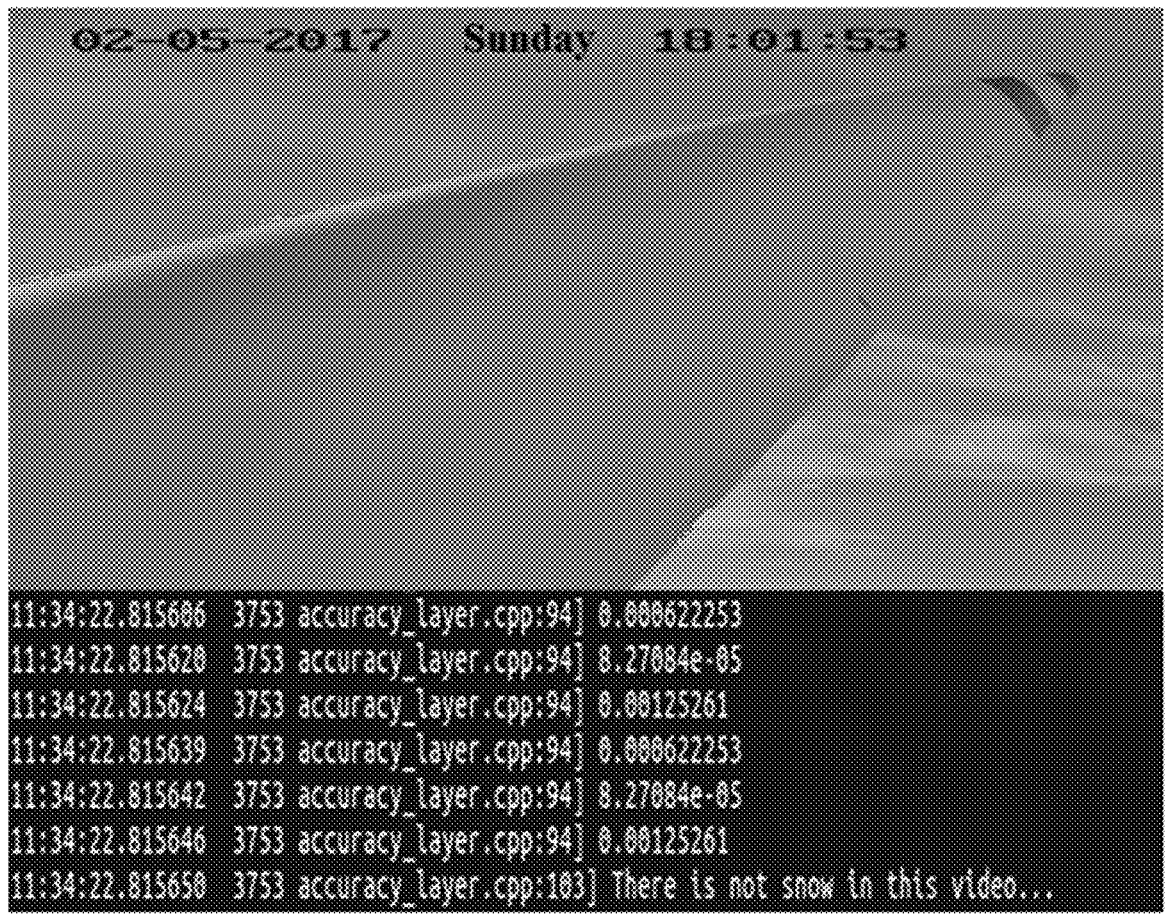

FIGS. 6 and 7 are examples of a recognition result of ice on the blade according to exemplary embodiments of the present disclosure. The number displayed after Accuracy_layer.cpp indicates a determined probability of ice on the blade. The more the number is close to 1, the higher the probability that the blade is recognized to be iced up is; the more the number is close to 0, the higher the probability that the blade is recognized to be not iced up is.

As an example, the edge detection method in the above exemplary embodiment may include following steps.

Filtering: since an edge detection algorithm mainly relates to a first order derivative and a second order derivative based on image intensity and the derivative is usually sensitive to noises, a filter may be used, to improve performance of an edge detector in terms of noises. For example. Gaussian filtering may be used.

Enhancement: a basis of enhancement edge is to determine variations of neighborhood intensities of each point in the image. An enhancement algorithm may highlight the point with significant variation in the neighborhood intensity value of image gray point. For example, a gradient amplitude may be calculated to determine the point.

Detection: in the enhanced image, there are many points with large gradient amplitude in the neighborhood, but some points are not the edge points we are looking for, therefore, these points may be selected. For example, a threshold method may be used to detect the points.

For example, a gradient amplitude G and a gradient direction θ may be calculated through following formulas:

$$G = \sqrt{G_x^2 + G_y^2} \quad (1)$$

$$\theta = \arctan\left(\frac{G_y}{G_x}\right) \quad (2)$$

Gx is a Gaussian distribution function in the x direction, and Gy is a Gaussian distribution function in the y direction.

Non-Maximum Suppression may be performed after the gradient direction is approximated to one of four possible angles (such as: 0, 45, 90, 135) to exclude non-edge pixels and reserve only some fine lines (candidate edges). Then, Canny operators may be used (a hysteretic threshold includes a high threshold and a low threshold): in a case where the gradient amplitude of a pixel position exceeds the high threshold, the pixel is reserved as an edge pixel; in a case where an amplitude of a pixel location is less than the low threshold, the pixel is excluded; and in a case where the amplitude of a pixel position is between the two thresholds, the pixel is reserved only when the pixel is connected to a pixel of which the amplitude is above the high threshold.

As an example, the significant object detection in the exemplary embodiment may be a significant object detection based on a Holistically-Nested Edge Detection (HED).

For example, a HED structure may be: T=f(Xn; Zn), where n={1, 2 ... N} represents the training set, Xn={$x_j$, j=1, ... Xn} is inputted images, Zn={$z_j$, j=1 ... |Xn|}, $Z_j$<[0,1], Zn represents the continuous real significant map related and corresponding to Xn. The subscript n may be omitted below for convenience. A set layer parameter W represents all standard networks. It is assumed that there are M side outputs, and each of side outputs is associated with a classifier, where the corresponding weight may be expressed as:

$$W(W^{(1)}, W^{(2)}, \ldots, W^{(M)}) \quad (3)$$

Therefore, a side objective function of HED may be given by the following formula:

$$L_{side}(W, w) = \sum_{m=1}^{M} a_m l_{side}^{(m)}(W, w^{(m)}) \quad (4)$$

$a_n$, indicates a weight of the m-th side loss, Lside indicates a balance cross entropy loss function of the image level of the m-th side output. In addition, a weighted fusion layer may be added to better capture an advantage of each side output. A fusion loss of the fusion layer may be expressed as:

$$L_{fuse}(W, w, f) = \sigma\left(Z, h\left(\sum_{m=1}^{M} f_m A_{side}^{(m)}\right)\right) \quad (5)$$

$F=(f_1, \ldots, f_m)$ is a fuse weight, $A_{side}^{(m)}$ is an output of activating the m-th layer, h is a sigmoid formula, representing a distance between a ground real figure and a fusion prediction, which is set to be a class balance cross entropy loss of the image level.

Each of steps of HED on VGGNET connects the output of the each side to the upper convolutional layer. For conv1_2, conv2_2, conv3_3, conv4_3, conv5_3, the output of the each side is combined into a single channel convolutional layer, its core is 1*1, and the upper layer samples is then for learning edge information.

A convolutional neural network is mainly used for recognizing displacement, scaling, and other forms of two-dimensional graphics with distortion-invariant. Since a feature detection layer of the CNNs learns through training data, an explicit feature extraction is avoided and learning is implicitly performed from the training data when using CNNs. Furthermore, due to the same nerve weights on one feature mapping surface, the network can learn in parallel. This is also a great advantage of the convolutional network over neurons-interconnected networks. The convolutional neural network has an unique advantage in image processing with its special structure of local weight sharing. Its layout is closer to an actual biological neural network. The sharing of weights reduces the complexity of the network, and especially the feature that images of a multi-dimensional input vector can be directly inputted to the network avoids complexity of data reconstruction during feature extraction and classification processes. The convolutional neural network avoids the explicit feature sampling (explicit feature extraction is not easy and is not always reliable in some applications), and learning is implicitly performed from the training data. In this case, the convolutional neural network significantly distincts from other classifiers based on neural networks, and integrates the feature extraction function into a multi-layer perceptron through structure recombination and weight reduction. It can directly process grayscale images and can be used directly for processing classification based on images. The convolutional neural network has the following advantages in image processing compared with the general neural network: a) the topological structure of the network and the inputted image can be well matched; b) the feature extraction and the pattern classification are carried out simultaneously and generated in training simultaneously; c) the weight sharing can reduce the training parameters of the network and simplify the neural network structure, also the neural network becomes more adaptable.

Considering features of ice on the blade, features of the blade image and features of the convolutional neural network, the recognition model of ice on a blade may be obtained by training on the sample set using a convolutional neural network, as an example.

Further, the recognition model of ice on a blade may include an input layer, convolutional layers of a first predetermined quantity (layer C), pooling layers of a second predetermined quantity (layer S), a vector layer (layer V) for vectorizing features of the blade image processed by the convolutional layers and pooling layers, a classifier for classifying vectors outputted from the vector layer (including, but not limited to, Softmax, SVM), and an output layer. The input layer includes multiple input neurons for describing pixels of the blade image. The output layer includes an output neuron for indicating whether ice is on the blade. Each convolutional layer performs feature extraction on the output of a previous layer by using at least one trained convolution kernel to obtain the output of the current layer. Each pooling layer performs aggregation statistical processing on an output of a previous convolutional layer by using at least one trained pooling kernel to obtain an output of the current layer. As an example, the first predetermined quantity and the second predetermined quantity are not fixed and may be determined based on specific conditions such as the sample set.

Specifically, the inputs of the convolutional layer and the pooling layer are all image pixel matrices, and all the outputs are processed image pixel matrices. That is, each layer imports the outputted pixel matrix into the next layer as the input of the next layer for further calculation. At the end, a series of final pixel matrices are obtained. The matrix may be operated on the basis of classifiers to obtain a result of 0/1, the formula may be: $y=\theta 1+\theta 2 \times 2+ \ldots \theta nXn$, ($y=\{0,1\}$, $\theta$ is a classifier parameter, X is a pixel matrix), the result of y are 0 and 1 that respectively correspond to an iced up condition and an un-iced up condition.

As an example, the image pixel matrix of 1920*1080*3 may be used as the input of the recognition model of ice on a blade, where 1920*1080 is a length and a width of the blade image, and 3 is RGB data of three channels. For each convolutional layer, a convolutional operation is performed on the pixel matrix by using the convolution kernel of the convolutional layer to output a new pixel matrix. In a case where the convolution kernel is a matrix of 5*5, the matrix of 1916*1086*3 is outputted.

As an example, in the recognition model of ice on a blade in the exemplary embodiment of the present disclosure, the convolutional layers and the pooling layers may be arranged alternately (i.e., starting with the first convolutional layer, then followed by a pooling layer, then by a convolutional layer) after the input layer, and the quantity of feature mappings of each layer of the convolutional layers and the pooling layers may be greater than the quantity of the feature mappings of a previous layer. That is, the quantity of the feature mappings is greater for the convolutional layer or the pooling layer that are arranged later.

As an example, the recognition model of ice on a blade in the exemplary embodiment of the present disclosure may include: a first hiding layer for achieving convolution (i.e., convolutional layer C1), a second hiding layer for achieving sub-sampling and local average (i.e., pooling layer S2), a third hiding layer for achieving second convolution (i.e., convolutional layer C3), a fourth hiding layer for achieving second sub-sampling and local average (i.e., pooling layer S4), and a fifth hiding layer for achieving last convolution (i.e., convolutional layer C5).

For example, the input layer of the convolutional neural network is used for receiving an original image (i.e., the blade image) and may consist of multiple sensing nodes. A calculation flow may be alternated between convolution and subsampling as follows.

The first hiding layer performs convolution. The first hiding layer may consist of N feature mappings, where each of feature mappings consists of multiple neurons each may specific an acceptance domain.

The second hiding layer performs sub-sampling and local average. The second hiding layer may consist of multiple feature mappings, where each of feature mappings may consist of multiple neurons. Each neuron may have an acceptance domain of 2*2, a trainable coefficient, a trainable bias and a sigmoid activation function. The trainable coefficient and the trainable bias control an operating point of the neurons.

The third hiding layer performs the second convolution. The third hiding layer may consist of multiple feature mappings, where each feature mapping may consist of multiple neurons. Each neuron in the hiding layer may have a synaptic connection connected to the multiple feature mappings in the next hiding layer. The third hiding layer may be operated in a manner similar to the first convolutional layer.

The fourth hiding layer performs the second subsampling and local average. The fourth hiding layer may consist of multiple feature mappings, where each feature mapping may consist of multiple neurons. The fourth hiding layer may be operated in a manner similar to the first sub-sampling.

The fifth hiding layer performs a last stage of convolution. The fifth hiding layer may consist of multiple neurons each may specific an acceptance domain. Then it is the vector layer that vectorizes the neurons in the fifth hiding layer.

As an example, the computation layers are successively alternate between the convolution and the sampling, which results in a "double spire" effect. That is, in each convolutional layer or sampling layer, with a decrease in a spatial resolution, the quantity of the feature mappings is increasing in relative with the corresponding previous layer.

As an example, there may be full connections from the input layer to the first hiding layer, from the fourth hiding layer to the fifth hiding layer, and from the fifth hiding layer to the vector layer. There may be one to one correspondence connections from the first hiding layer to the second hiding layer, and from the third hiding layer to the fourth hiding layer. In order to avoid network symmetry, a part of connection from the second hiding layer to the third hiding layer may be removed so as to diversity the feature mappings. It should be noted that a size of the convolution kernel of the fifth hiding layer should be the same as the output of the fourth hiding layer, to ensure that the output is a one-dimensional vector.

As a preferably example, the recognition model of ice on a blade in the exemplary embodiment of the present disclosure may include multiple convolution stages which are connected via the pooling layers, where each convolution stage includes at least one convolutional layer. The sizes of the convolution kernels included in the convolutional layers in the multiple convolution stages are the same (i.e., the sizes of the convolution kernels of all the convolutional layers are the same), and the later the convolutional layer in the convolution stage is performed, the greater the quantity of the convolution kernels included in the convolutional layer in the convolution stage is. As a preferable example, the size of the convolution kernel may be 3*3.

FIG. 8 is an example of a configuration manner of a recognition model of ice on a blade according to an exemplary embodiment of the present disclosure. As shown in FIG. 8, each column indicates network structures under different configuration manners of A to E, and the parameter quantity for each subsequent level. The configuration manners each has five convolution stages, and the convolution stages each has at least one convolutional layer. Also a maximum pooling layer is connected after each convolution stage to reduce the size of the image. The quantity of the convolution kernels included in the convolutional layers in each convolution stage is the same, and the later the convolutional layer in the convolution stage is performed, the greater the quantity of the convolution kernels included in the convolutional layer in the convolution stage is. For example, it may increase as follows: 64-128-256-512-512. The first convolution stage of the configuration manner A is taken as an example, which includes one convolutional layer, where conv3-64 indicates that the convolutional layer includes 64 convolution kernels with the size of 3*3.

Considering a relation between a depth and a performance of the CNN, in the exemplary embodiment of the present disclosure, a CNN with a depth of 16 to 19 layers is constructed through repeatedly stacking small convolution kernels with the sizes of 3*3 and maximum pooling layers with 2*2 pooling kernels. The network uses all of the convolution kernels with the sizes of 3*3 and the pooling kernels with the sizes of 2*2. The performance is improved by continuously deepening the network structure.

Although the network from levels A to E is gradually getting deeper, the quantity of the parameters of the network is not increasing much, this is because the quantity of the parameters is mainly consumed in the last three full connection layers. A front convolutional part is very deep, but the quantity of the parameters consumed is small, and the time-consuming part of training is still the convolution, this is because it has a large amount of computation. A fully connection layer FC-4096 is taken as an example, where 4096 indicates the quantity of elements of the full connection layer.

Configuration manner C has more convolutional layer of 1*1 compared with configuration manner B. The convolution of 1*1 is mainly for linear transformation, while the quantity of the input channels and output channels are not changed, and there is no reduction of dimensionality.

As shown in FIG. 8, in the exemplary embodiment of the present disclosure, multiple the same convolutional layers with the sizes of 3*3 are stacked, this is because the case that a series connection of two convolutional layers with the sizes of 3*3 is equivalent to one convolutional layer with the size of 5*5, that is, one pixel may be associated with 5*5 pixels around the pixel, i.e., the size of the receptive field is 5*5; and a series connection of three convolutional layers with the sizes of 3*3 is equivalent to one convolutional layer with the size of 7*7. However, the three convolutional layers with the sizes of 3*3 in the series connection have less parameters than the one convolutional layer with the size of 7*7, i.e., have parameters only half of the later; and the three convolutional layers with the sizes of 3*3 have more non-linear transformations than the one convolutional layer with the size of 7*7 (the former can use a ReLU activation function for three times, and the later can use the function only once), therefore the CNN provided in the exemplary embodiment of the present disclosure has a stronger ability for learning features.

In the above exemplary embodiment of the present disclosure, the following advantages may be achieved: (1) light spot projected on the blade can be filtered out; (2) ice on any position of the blade (positions such as blade tip, middle blade, etc.) can be recognized; (3) ice region of any shape (strip area, sheet-like areas, etc.) can be recognized; (4) ice region of the blade in the image captured at night can be recognized in the above embodiments even if the brightness of the images captured at night is dark and the brightness of the image obtained after supplemented with infrared light is still dark.

Figure 9:
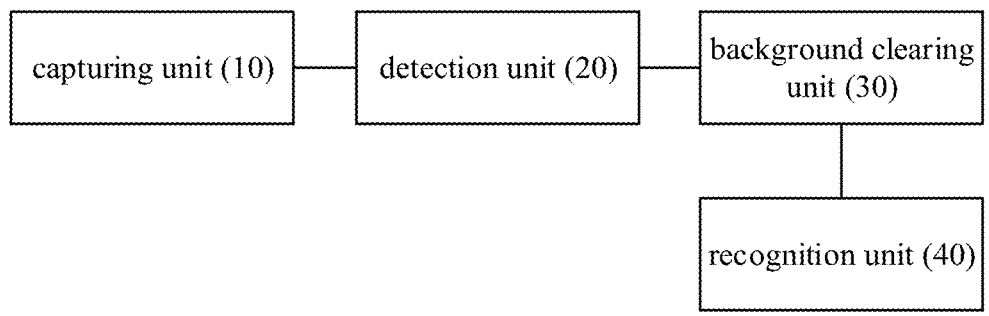
FIG. 9 is a block diagram of an apparatus for monitoring formation of ice on a wind turbine blade according to an exemplary embodiment of the present disclosure.

FIG. 9 is a block diagram of an apparatus for monitoring formation of ice on a wind turbine blade according to an exemplary embodiment of the present disclosure.

As shown in FIG. 9, an apparatus for monitoring formation of ice on a wind turbine blade is provided according to an exemplary embodiment of the present disclosure, which includes a capturing unit 10, a detection unit 20, a background clearing unit 30 and a recognition unit 40.

The capturing unit 10 is configured to capture an image of a blade through a camera.

As an example, the capturing unit 10 may periodically capture the image of the blade through the camera.

The detection unit 20 is configured to detect a region of the blade from the captured image.

As an example, the detection unit 20 may detect the region of the blade from the captured image by edge detection and/or significant object detection.

As an example, the significant object detection may be a significant object detection based on a Holistically-Nested Edge Detection (HED).

As an example, a training set of the significant object detection may include at least one of the following types of images: blade images captured at different geographic locations, blade images captured at different time periods, blade images captured under different weather conditions.

The background clearing unit 30 is configured to clear image information of a background region, which is a region in the captured image except for the region of the blade, from the captured image, to obtain a blade image.

The recognition unit 40 is configured to input the obtained blade image into a recognition model of ice on a blade obtained by training on a sample set, to determine whether ice is on the captured blade, where the sample set comprises a plurality of blade images indicating that ice is on blades.

As an example, the recognition model of ice on a blade may be obtained by training on the sample set using a convolution neural network. The recognition model of ice on a blade comprises an input layer, a first predetermined quantity of convolutional layers, a second predetermined quantity of pooling layers, a vector layer for vectorizing a feature of the blade image processed by the convolutional layers and the pooling layers, a classifier for classifying vectors outputted from the vector layer, and an output layer. The input layer comprises a plurality of input neurons for describing pixels of the blade image, the output layer comprises an output neuron for indicating whether ice is on the blade, the convolutional layers each performs feature extraction on an output of a previous layer by using at least one trained convolution kernel to obtain an output of the convolutional layer itself, and the pooling layers each performs aggregation statistical processing on an output of a previous convolutional layer by using at least one trained pooling kernel to obtain an output of the pooling layer itself.

As an example, in the recognition model of ice on a blade in the exemplary embodiment of the present disclosure, the convolutional layers and the pooling layers are arranged alternately after the input layer, and a quantity of feature mappings for each layer of the convolutional layers and the pooling layers is greater than a quantity of feature mappings for a previous layer.

As an example, the recognition model of ice on a blade in the exemplary embodiment of the present disclosure may include multiple convolution stages which are connected via the pooling layers. The convolution stages each includes at least one convolutional layer, the convolution kernels included in the convolutional layers in the multiple convolution stages have the same size, and the later the convolutional layer in the convolution stage is performed, the greater the quantity of the convolution kernels included in the convolutional layer in the convolution stage is. As a preferable example, the size of the convolution kernel may be 3*3.

As an example, the sample set may include at least one of the following types of blade images: blade images indicating that ice is on blades and captured at different geographic locations, blade images indicating that ice is on blades and captured at different time periods, and blade images indicating that ice is on blades and captured under different weather conditions.

As an example, the apparatus for monitoring formation of ice on a wind turbine blade provided according to the exemplary embodiment of the present disclosure may further include: a determining unit (not shown).

The determining unit is configured to determine whether ice is on the captured blade based on a recognition result corresponding to each image of multiple images of the blade captured in a predetermined time period, where the recognition result corresponding to the each image is obtained by performing operations by the detection unit, the background clearing unit and the recognition unit on the each image.

As an example, the determining unit may determine, from the multiple images, a first quantity of images that the corresponding recognition results indicate that the blade is iced up, and a second quantity of images that the corresponding recognition results indicate that the blade is not iced up. In a case where the first quantity is greater than the second quantity, it is determined that the captured blade is iced up; and in a case where the second quantity is greater than the first quantity, it is determined that the captured blade is not iced up.

It should be understood that the specific implementation of the apparatus for monitoring formation of ice on a wind turbine blade provided according to the exemplary embodiment of the present disclosure may be achieved by referring to the related specific implementations described in conjunction with FIG. 1, which is not repeated herein.

As an example, a computer readable storage medium storing a computer program is further provided according to another exemplary embodiment of the present disclosure. When the computer program is executed, the above method for monitoring formation of ice on a wind turbine blade according to any above exemplary embodiment is implemented.

As an example, a computer is provided according to an exemplary embodiment of the present disclosure, which includes a readable storage medium storing a computer program, where when the computer program is executed in the computer, the above method for monitoring formation of ice on a wind turbine blade according to any above exemplary embodiment is implemented.

With the apparatus and method for monitoring formation of ice on a wind turbine blade provided according to the exemplary embodiments of the present disclosure, whether the blade of the wind turbine is iced up can be monitored quickly and accurately, and the apparatus and method can be applied to a wide range of regions without the need of design for different wind farms.

With the apparatus and method for monitoring formation of ice on a wind turbine blade provided according to the exemplary embodiments of the present disclosure, an alarm is triggered or a de-icing equipment is triggered to work when it is monitored that ice is on the blade; and a monitoring result, when it is monitored that ice on the blade condition is vanished, can be quickly fed back to a central control room to cause the on-site maintenance personnel to restart the wind turbine in time. In this way, the damage caused by ice on the blade can be prevented, also can be used as a trigger signal for a related troubleshooting system and the wind turbine can be restarted in time after the breakdown, thereby reducing economic losses due to downtime caused by ice on the blade.

In addition, it should be noted that the various units in the apparatus for monitoring formation of ice on a wind turbine blade according to the exemplary embodiment of the disclosure can be implemented as a hardware component and/or a software module. Those skilled in the art can implement the various units by using, for example, a field programmable gate array (FPGA) or an application-specific integrated circuit (ASIC), according to the process performed by each unit.

In addition, the method for monitoring formation of ice on a wind turbine blade according to the exemplary embodiments of the disclosure can be implemented as computer codes stored in a computer readable storage medium. Those skilled in the art can implement the computer codes according to the description of the above method. When the computer codes are executed in the computer, the above method according to the present disclosure is implemented.

Although some exemplary embodiments of the present application is illustrated and described, those skilled in the art should understand that those embodiments can be modified without departing from the principle and spirit of the present disclosure limited by the claims and the equivalents.

The invention claimed is:

1. A method for monitoring formation of ice on a wind turbine blade, comprising:
   capturing an image of the blade through a camera;
   detecting a region of the blade from the captured image by a significant object detection;
   clearing image information of a background region from the captured image, which is in the captured image except for the region of the blade, to obtain a blade image, wherein in the obtained blade image, background noises are removed without loss of information amount of the blade image; and
   inputting the obtained blade image into a recognition model of ice on a blade obtained by training on a sample set, to determine whether ice is on the captured blade, wherein the sample set comprises a plurality of blade images indicating that ice is on blades,
   wherein a training set for the significant object detection comprises at least one of the following types of images: blade images captured at different geographic locations, blade images captured at different time periods, and blade images captured under different weather conditions,
   wherein the recognition model of ice on the blade is obtained by training on the sample set using a convolution neural network, and the convolution neural network has a depth of 16 to 19 layers and is constructed by repeatedly stacking a convolution kernel with a size of 3*3 and a pooling kernel with a size of 2*2,
   wherein the recognition model of ice on the blade comprises an input layer, a first predetermined quantity of convolutional layers, and a second predetermined quantity of pooling layers,
   wherein in the recognition model of ice on the blade, the convolutional layers and the pooling layers are arranged alternately after the input layer.

2. The method according to claim 1, wherein the recognition model of ice on the blade further comprises a vector layer for vectorizing a feature of the blade image processed by the convolutional layers and the pooling layers, a classifier for classifying vectors outputted from the vector layer, and an output layer, and
   wherein the input layer comprises a plurality of input neurons for describing pixels of the blade image, the output layer comprises an output neuron for indicating whether ice is on the blade, the convolutional layers each performs feature extraction on an output of a previous layer by using at least one trained convolution kernel to obtain an output of the convolutional layer itself, and the pooling layers each performs aggregation statistical processing on an output of a previous convolutional layer by using at least one trained pooling kernel to obtain an output of the pooling layer itself.

3. The method according to claim 2, wherein in the recognition model of ice on the blade, a quantity of feature mappings for each layer of the convolutional layers and the pooling layers is greater than a quantity of feature mappings for a previous layer.

4. The method according to claim 2, wherein the recognition model of ice on the blade comprises a plurality of convolution stages which are connected via the pooling layers, wherein the convolution stages each comprises at least one convolutional layer, the convolution kernels included in the convolutional layers in the plurality of convolution stages have the same size, and the later the convolutional layer in the convolution stage is performed, the greater the quantity of the convolution kernels included in the convolutional layer in the convolution stage is.

5. The method according to claim 1, wherein the sample set comprises at least one of the following types of blade images: blade images indicating that ice is on blades and captured at different geographic locations, blade images indicating that ice is on blades and captured at different time periods, and blade images indicating that ice is on blades and captured under different weather conditions.

6. The method according to claim 1, wherein detecting the region of the blade from the captured image comprises:
   detecting the region of the blade from the captured image by using an edge detection and the significant object detection.

7. The method according to claim 6, wherein the significant object detection is based on a Holistically-Nested Edge Detection (HED).

8. The method according to claim 1, wherein capturing the image of the blade through the camera comprises:
   capturing an image of the blade periodically through the camera, wherein the method further comprises:
   determining whether ice is on the captured blade based on a recognition result corresponding to each image of a plurality of images of the blade captured in a predetermined time period, wherein the recognition result corresponding to the each image is obtained by performing the steps of detecting the region of the blade, obtaining the blade image and determining whether ice is on the captured blade sequentially on the each image.

9. An apparatus for monitoring formation of ice on a wind turbine blade, comprising a processor and a non-transitory storage medium having a plurality of instructions stored thereon that, when executed by the processor, cause the processor to:

capture an image of the blade through a camera;

detect a region of the blade from the captured image by a significant object detection;

clear image information of a background region from the captured image, which is in the captured image except for the region of the blade, to obtain a blade image, wherein in the obtained blade image, background noises are removed without loss of information amount of the blade image; and input the obtained blade image into a recognition model of ice on a blade obtained by training on a sample set, to determine whether ice is on the captured blade, wherein the sample set comprises a plurality of blade images indicating that ice is on blades, wherein a training set for the significant object detection comprises at least one of the following types of images: blade images captured at different geographic locations, blade images captured at different time periods, and blade images captured under different weather conditions, wherein the recognition model of ice on the blade is obtained by training on the sample set using a convolution neural network, and the convolution neural network has a depth of 16 to 19 layers and is constructed by repeatedly stacking a convolution kernel with a size of 3*3 and a pooling kernel with a size of 2*2, wherein the recognition model of ice on the blade comprises an input layer, a first predetermined quantity of convolutional layers, and a second predetermined quantity of pooling layers, wherein in the recognition model of ice on the blade, the convolutional layers and the pooling layers are arranged alternately after the input layer.

10. The apparatus according to claim 9, wherein the recognition model of ice on the blade further comprises a vector layer for vectorizing a feature of the blade image processed by the convolutional layers and the pooling layers, a classifier for classifying vectors outputted from the vector layer, and an output layer, and wherein the input layer comprises a plurality of input neurons for describing pixels of the blade image, the output layer comprises an output neuron for indicating whether ice is on the blade, the convolutional layers each performs feature extraction on an output of a previous layer by using at least one trained convolution kernel to obtain an output of the convolutional layer itself, and the pooling layers each performs aggregation statistical processing on an output of a previous convolutional layer by using at least one trained pooling kernel to obtain an output of the pooling layer itself.

11. The apparatus according to claim 10, wherein in the recognition model of ice on the blade, a quantity of feature mappings for each layer of the convolutional layers and the pooling layers is greater than a quantity of feature mappings for a previous layer.

12. The apparatus according to claim 10, wherein the recognition model of ice on the blade comprises a plurality of convolution stages which are connected via the pooling layers, wherein the convolution stages each comprises at least one convolutional layer, the convolution kernels included in the convolutional layers in the plurality of convolution stages have the same size, and the later the convolutional layer in the convolution stage is performed, the greater the quantity of the convolution kernels included in the convolutional layer in the convolution stage is.

13. The apparatus according to claim 9, wherein the sample set comprises at least one of the following types of blade images: blade images indicating that ice is on blades and captured at different geographic locations, blade images indicating that ice is on blades and captured at different time periods, and blade images indicating that ice is on blades and captured under different weather conditions.

14. The apparatus according to claim 13, wherein the instructions cause the process to detect the region of the blade from the captured image by using an edge detection and the significant object detection.

15. The apparatus according to claim 14, wherein the significant object detection is based on a Holistically-Nested Edge Detection (HED).

16. The apparatus according to claim 9, wherein the instructions cause the process to capture an image of the blade periodically through the camera, and wherein the apparatus further comprises instructions that cause the process to:

determine whether ice is on the captured blade based on a recognition result corresponding to each image of a plurality of images of the blade captured in a predetermined time period, wherein the recognition result corresponding to the each image is obtained by performing operations by the detection unit, the background clearing unit and the recognition unit on the each image.

17. A non-transitory computer readable storage medium storing a computer program, wherein the computer program, when being executed by a computer, cause the computer to:

capture an image of the blade through a camera;

detect a region of the blade from the captured image by a significant object detection;

clear image information of a background region, which is a region in the captured image except for the region of the blade, from the captured image, to obtain a blade image, wherein in the obtained blade image, background noises are removed without loss of information amount of the blade image; and input the obtained blade image into a blade icing recognition model obtained by training on a sample set, to determine whether the captured blade is iced up, wherein the sample set comprises a plurality of blade images with iced up blades indicated, wherein a training set for the significant object detection comprises at least one of the following types of images: blade images captured at different geographic locations, blade images captured at different time periods, and blade images captured under different weather conditions, wherein the blade icing recognition model is obtained by training on the sample set using a convolution neural network, and the convolution neural network has a depth of 16 to 19 layers and is constructed by repeatedly stacking a convolution kernel with a size of 3*3 and a pooling kernel with a size of 2*2, wherein the blade icing recognition model comprises an input layer, a first predetermined quantity of convolutional layers, and a second predetermined quantity of pooling layers, wherein in the blade icing recognition model, the convolutional layers and the pooling layers are arranged alternately after the input layer.

* * * * *